(12) United States Patent  (10) Patent No.: US 8,273,208 B2
Brinner  (45) Date of Patent: Sep. 25, 2012

(54) STRUCTURAL COMPOSITE LAMINATE, AND PROCESS OF MAKING SAME

(75) Inventor: Timothy Alan Brinner, Elmhurst, IL (US)

(73) Assignee: Intrinsix, LLC, Elmhurst, IL (US)

( * ) Notice: Subject to any disclaimer, the term of this patent is extended or adjusted under 35 U.S.C. 154(b) by 1508 days.

(21) Appl. No.: 11/225,208

(22) Filed: Sep. 14, 2005

(65) Prior Publication Data

US 2007/0056687 A1   Mar. 15, 2007

(51) Int. Cl.
*B32B 37/10* (2006.01)

(52) U.S. Cl. ........ 156/290; 156/291; 156/292; 156/300; 428/218; 428/314.4; 428/318.4; 428/319.3; 428/319.7; 428/320.2; 428/321.5; 428/327; 264/113; 264/112

(58) Field of Classification Search ............ 428/72, 428/178, 69, 218, 314.4, 304.4, 318.4, 319.3, 428/319.7, 230.2, 321.5, 327; 156/297, 300, 156/306.6, 290–292; 264/112, 113
See application file for complete search history.

(56) References Cited

U.S. PATENT DOCUMENTS

| | | | |
|---|---|---|---|
| 2,928,456 A * | 3/1960 | Potchen et al. | 442/224 |
| 3,617,351 A | 11/1971 | Long et al. | |
| 4,304,824 A * | 12/1981 | Karpinski | 428/69 |
| 4,326,003 A * | 4/1982 | Bouhaniche | 428/198 |
| 4,709,781 A | 12/1987 | Scherzer | |
| 5,100,730 A * | 3/1992 | Lambers | 428/402 |
| 5,143,664 A * | 9/1992 | Noguchi et al. | 264/113 |
| 5,219,629 A * | 6/1993 | Sobolev | 428/35.9 |
| 5,275,848 A | 1/1994 | Mito et al. | |
| 5,530,048 A * | 6/1996 | McDonald et al. | 524/418 |
| 5,718,968 A * | 2/1998 | Cutler et al. | 428/218 |
| 5,888,642 A * | 3/1999 | Meteer et al. | 428/313.5 |
| 6,007,890 A | 12/1999 | DeBlander | |
| 6,368,721 B1 | 4/2002 | Watanabe et al. | |
| 2002/0176960 A1 | 11/2002 | Nadezhdin et al. | |
| 2003/0013238 A1* | 1/2003 | Ogawa | 438/151 |
| 2005/0025956 A1* | 2/2005 | Bainbridge | 428/317.3 |

* cited by examiner

*Primary Examiner* — Christopher Schatz
(74) *Attorney, Agent, or Firm* — Berenato & White, LLC

(57) ABSTRACT

A structural composite laminate and method of making the same are provided. The laminate includes first and second skins or laminas, and a core positioned between the first and second laminas. The core contains thermoplastic and/or substantially inelastic polymeric particles with inter-particle interstices between the polymeric particles. Optionally, the polymeric particles are arranged discontinuously to establish gaps between adjacent particles along at least one dimension of the laminate.

25 Claims, 7 Drawing Sheets

STRUCTURAL COMPOSITE LAMINATE, AND PROCESS OF MAKING SAME

FIELD OF THE INVENTION

The present invention generally relates to structural composite laminates, and in particular to structural composite laminates possessing low density and excellent internal strength. The present invention further relates to processes of manufacturing the structural composite laminates.

BACKGROUND OF THE INVENTION

Composite laminates, also known as sandwich composites, are widely known for their low densities and high mechanical conformability. Generally, composite laminates feature two high tensile strength outer metal skins, and an intermediate core extending continuously and coextensively along the skins. In order to minimize weight, the core typically either is composed of foam or possesses a construction aimed at weight reduction, such as a honeycomb structure. Adhesives at each of the core-skin interfaces bond the skins and core together.

Processes of manufacturing sandwich composites generally involve the practice of a wet lay-up, lamination press, autoclave, or closed mold technique. An example of a lamination manufacturing process is depicted in FIG. 15. A movable top platen 202 and a bottom platen 204 of a press arranged in open, spaced apart relationship carry lay-up plates 206 and 208, respectively. To make laminate 210, outer skins 211, 212 are placed on the inner surfaces of lay-up plates 206, 208, respectively. Adhesives 214, 215 are either pre-coated on the inward facing surfaces of skins 211, 212 or applied to skins 211, 212 during lay-up in the press. Honeycomb or foam core 216 is situated between adhesive layers 214, 215. Then, platen 202 is moved downward to close the press, and platens 202, 204 are heated to a temperature sufficiently high to melt adhesive layers 214, 215. High pressure is applied by platens 202, 204 as adhesive layers 214, 215 are melted then subsequently allowed to cool. Once cooled, adhesive layers 214, 215 bond the opposite sides of core 216 to skins 211, 212, respectively.

While the above-described manufacturing process establishes bonding between skins 211, 212 and core 216, it is also responsible for introducing latent stresses into laminate 210. The latent stresses arise from the different coefficients of expansion possessed by the skin and core materials. Generally, metal skins 211, 212 contract less than core 216 during the cooling stage of manufacture. The disparity in contraction rates of skins 211, 212 and core 216 introduces a shear force at the core-skin interface, that is, along adhesive layers 214, 215, as pictorialized in FIG. 16. The setting of adhesive layers 214, 215 simultaneously with experienced shear forces at the core-skin interface builds a latent shear stress into laminate 210 along adhesion layers 214, 215, especially in continuous lamination processes where cooling is conducted at high rates. The incorporated stress may not be observable or revealed as a defect until long after manufacturing, such as when laminate is in use in the field.

Manifestation of defects caused by the latent stresses in laminate 210 may occur in the field as the result of vibratory energy or a traumatic force applied to laminate 210. In FIG. 17, for example, point A on skin 212 represents an impact region of a large vibratory force. Because core 216 is fashioned as a continuous film contiguous with skins 211, 212, vibratory energy imparted at point A passes directly from skin 212 to core 216, which transports the energy along the length and width of skins 211, 212. The propagation of the vibratory energy throughout laminate 210, combined with the intrinsic latent shear stress infused into adhesive layers 214, 215 during lamination, can overcome the bond strength of adhesive layers 214, 215 and cause one or both of skins 211, 212 to delaminate in part or entirely from core 216.

Similarly, FIG. 18 depicts the effect of a downward impact force on skin 211. The impact force shown in FIG. 18 is sufficient in magnitude to physically deform skins 211, 212 and core 216. While metal skins 211, 212 experience little or no change in thickness caused by the impact force, the continuous solid core 216 is compressed between skins 211, 212. Compressed core 216 displaces laterally outward at and beyond the impact zone. The lateral displacement of core 216, juxtaposed against the lesser effected skins 211, 212, generates a shear action at the skin-core interfaces, which already are infused with latent internal shear stresses described above. Consequently, the impact force may overcome the bond strength of adhesive layers 214, 215, causing one or both of skins 211, 212 to delaminate in part or completely from core 216. The extent of delamination can be compounded if laminate 210 experiences additional vibratory energy or physical impacts.

It is therefore an object of the present invention to provide a structural sandwich composite and a process of manufacturing the same that reduce or eliminate the above described drawbacks of known sandwich composites.

SUMMARY OF THE INVENTION

To achieve the foregoing object, and in accordance with the purposes of the invention as embodied and broadly described herein, according to an aspect of this invention there is provided a process for making a structural composite laminate comprising a first lamina, a second lamina, and a core positioned between the first and second laminas. The process comprises depositing a plurality of solid yet deformable discrete thermoplastic polymeric particles on a first lamina with inter-particle voids between the thermoplastic polymeric particles. A second lamina is applied over the thermoplastic polymeric particles. The thermoplastic polymeric particles are permanently deformed against the first lamina to establish a core retaining the inter-particle voids.

According to another aspect of the invention, a process for making a structure composite laminate is provided. The process comprises depositing a plurality of solid yet deformable, discrete, substantially inelastic polymeric particles on a first lamina while providing inter-particle voids between the polymeric particles. Then, a second lamina is placed over the substantially inelastic polymeric particles. The substantially inelastic polymeric particles are permanently deformed against the first lamina to establish a core having the inter-particle voids.

According to still another aspect of the invention, a structural composite laminate is provided. The laminate comprises a first lamina, a core comprising a plurality of polymeric particles on the first lamina with inter-particle voids between the polymeric particles, and a second lamina over the core. The polymeric particles are permanently deformed, yet retain the inter-particle voids.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

Figure 1:
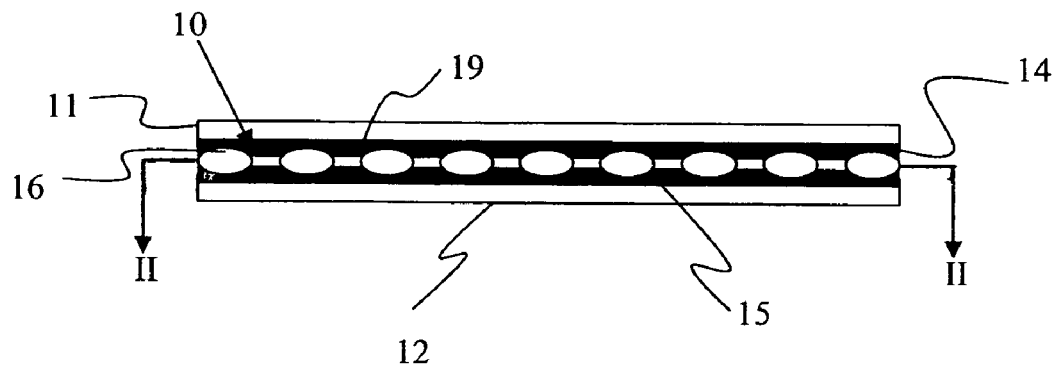
FIG. 1 is a side view of a structural composite laminate according to a first embodiment of the invention.

DETAILED DESCRIPTION OF PREFERRED EMBODIMENTS AND PREFERRED METHODS OF THE INVENTION

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

Referring now more particularly to the illustrated embodiments, FIG. 1 depicts a structural composite laminate generally depicted by reference numeral 10. Structural composite laminate 10 features an upper outer lamina or skin 11 and a lower outer lamina or skin 12. For the purposes of this disclosure, the terms "upper" and "lower" are used to facilitate reference to the drawings and an understanding of the invention, and do not necessarily represent structural limitations. Outer laminas 11, 12 are preferably made of a substantially rigid yet malleable material. Metals and metal alloys are especially suitable lamina materials, with aluminum and steel particularly preferred. Other materials from which laminas 11, 12 may be selected or made include, for example, reinforced composites (e.g., fiberboard), plywood, gypsum, drywall, etc. Laminas 11, 12 may be made of the same or different materials.

The selected dimensions of outer laminas 11, 12 will largely depend on the intended use of structural composite laminate 10. Representative yet not necessarily limiting examples of thicknesses for each of outer laminas 11, 12 range from about 1 mil (0.0254 mm) to about 250 mils (6.35 mm), or about 10 mils (0.254 mm) to about 100 mils (2.54 mm). It should be understood that upper and lower outer lamina 11, 12 may possess the same or different thicknesses and other dimensions relative to one another. In the illustrated embodiment, outer laminas 11, 12 are shown as substantially flat, with rectangular configurations when viewed from overhead and constant thicknesses. It is within the scope of the invention to provide one or both of outer laminas 11, 12 with non-flat, e.g., curved, profiles and/or variable thicknesses. Similarly, outer laminas 11, 12 may possess perimeters with rectangular or other shapes, such as, for example, alternative polygonal, arcuate, or random shapes. The surfaces, more typically the outward-facing surfaces, of laminas 11, 12 may receive a protective treatment and/or decorative material or coating. For example, the outer surfaces may be painted, lacquered, corona-surface treated, anodized, etc. It is also possible to apply one or more additional layers, such as decorative foils, to the outward-facing surfaces of outer laminas 11, 12.

Figure 2:
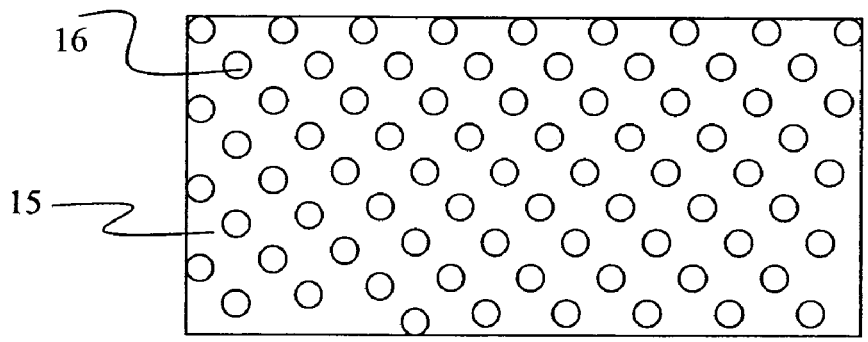
FIG. 2 is a cross section of the composite laminate taken along sectional line II-II of FIG. 1.

Adhesives 14 and 15 are situated on the inward-facing surfaces of outer laminas 11, 12. As shown in FIGS. 1 and 2, adhesives 14 and 15 of the first illustrated embodiment are configured as continuous sheets that are contiguous and co-extensive with laminas 11 and 12, respectively. Representative bonding agents that may be useful include polyacrylates, such as ethyl methyl acrylate and ethylene ethyl acrylate, and ethylene vinyl acetate. The bonding agents may be laminated, spray-coated, printed, or otherwise applied to laminas 11, 12.

Core 16 is embodied as substantially discrete solid polymeric particles joining top and bottom laminas 11, 12 to one another. The shape or shapes of the solid core particles is not particularly restricted. The particles may have the appearance of pellets or beads possessing, for example, spherical, oblong, polygonal, coarse, and/or random shapes. However, the solid core particles preferably have been permanently deformed as the result of compressive forces and/or applied temperatures encountered during processing. The maximum dimension (e.g., diameter) of the particles preferably yet optionally is, on average, in a range of about 800 microns to about 10 cm, more preferably about 800 microns to about 300 mm.

The particles composing core 16 may comprise a thermoplastic or thermoset material. Suitable thermoplastics include homopolymers and copolymers comprising at least one $\alpha$-olefin, such as ethylene and/or propylene. As referred to herein, the term copolymer includes terpolymers. Optionally, the olefin may be copolymerized with at least one additional monomer for imparting adhesive properties to the particles. Acrylic and methacrylic acid are examples of such additional monomers. Exemplary copolymers include those derived from ethylene and acrylic acid (EAA) or methacrylic acid (EMAA). Suitable EAA and EMAA available through Dow Chemical and DuPont, respectively. Thermosets that may be selected as core 16 include, for example, thermosetting polyethylene, polyesters, and epoxies. Preferably, the particles of core 16 are substantially inelastic, i.e., non-elastomers that lack sufficient memory to return to their original physical shapes upon release of a high compressive force and temperatures encountered during processing. In a particularly preferred embodiment of the invention, the core particles have a compression set greater than 30 as measured by ASTM D395 at 50° C. for 24 hours. Although it is within the scope of the invention to employ particles with foam properties, it is preferable that the particles of core 16 not constitute foam, i.e., nonporous particles free of intra-particle voids.

As best shown in FIG. 2, the particles of core 16 of this first embodiment are substantially discrete and are spaced apart from one another along both the length and width of lamina 11 to define inter-particle interstices or voids 19 between adjacent particles. The arrangement of core particles 16 shown in FIG. 2 is patterned, although it should be understood that core particles 16 may be arranged, for example, in other patterns than that depicted or randomly. Representative ranges of inter-particle interstices or voids 19 by core volume preferably is in a range of about 15 to about 75 percent, and more preferably in a range of about 20 to about 40 percent, depending upon the particle size and the number of tiers of core particles. Generally, void volume may be increased by increasing the size of or spacing between core particles 16.

Figure 3:
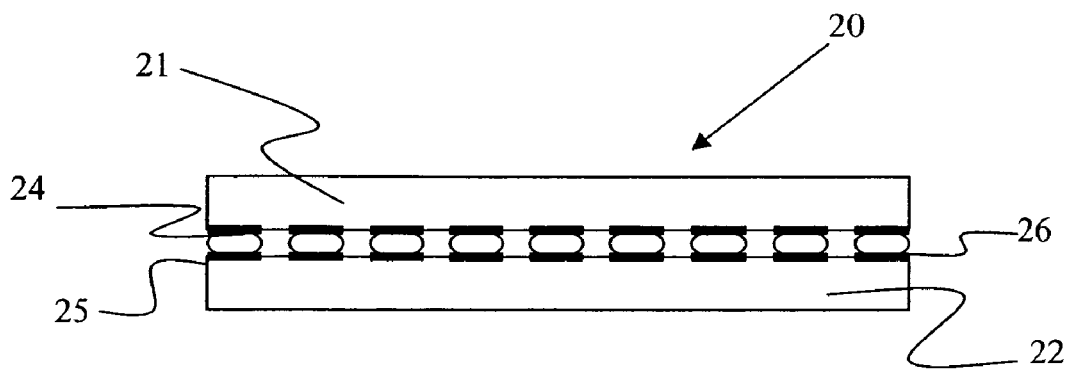
FIGS. 3 to 9 are side views of structural composite laminates according to second to eighth inventive embodiments, respectively.

Various modifications to the embodiment described above and illustrated in FIGS. 1 and 2 may be made. Examples of some suitable modifications are described below and depicted in FIGS. 3-9. It should be understood that these modifications and alterations are meant to be representative, not exhaustive. Further, it is within the scope of the invention to practice the embodiments described herein in various combinations with one another. For example, adhesives 14, 15 need not be sheets or co-extensive with laminas 11, 12. FIG. 3 shows a second embodiment in which a composite laminate 20 features adhesives 24, 25 positioned on the inner surfaces of laminas 21, 22 at discrete regions corresponding to locations at which polymeric particles of core 26 are situated. No adhesive is provided at surface regions of laminas 21, 22 that correspond to interstices or gaps between core particles 26. Adhesives 24, 25 of this embodiment may be pre-applied to laminas 21, 22, for example, using a print roller. Alternatively, core particles 26 may be pre-coated with adhesives 24, 25 prior to contacting particles 26 with the laminas 21, 22.

Figure 4:
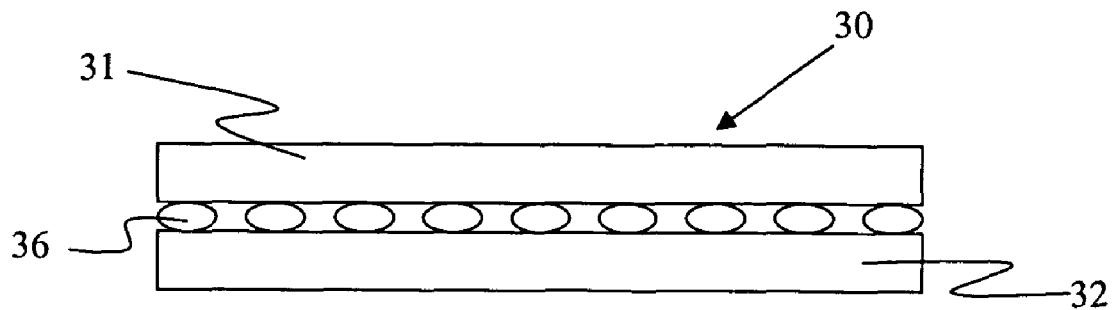

The third embodiment depicted in FIG. 4 departs from that of FIG. 1 in its elimination of adhesive layers. Composite laminate 30 of FIG. 4 includes a core 36 of thermoplastic particles melt-bonded to each of laminas 31, 32. Particularly preferred for this and other embodiments excluding distinct adhesive layers are copolymer particles derived from at least one olefin monomer and at least one acrylic acid or methacrylic acid monomer, such as EAA. In the embodiment depicted in FIG. 4, the particles are spaced apart from one another to establish core 36 that extends non-continuously along the length and width of laminas 31, 32.

Figure 5:
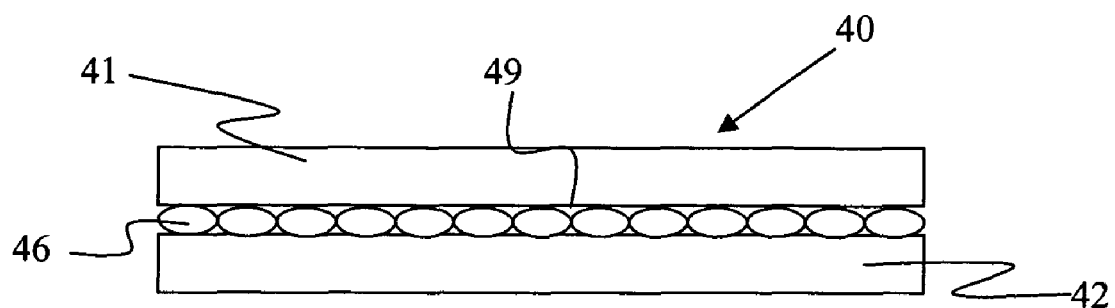

FIG. 5 depicts a fourth embodiment of a laminate 40 that is similar to laminate 30 in its omission of adhesive layers. Unlike the embodiments depicted in FIGS. 1-4, core 46 of FIG. 5 is comprised of particles in continuous contact with one another along the length of laminas 41, 42. Hence, core 46 is free of discontinuities between the contacting core particles. The particles may be fused or bonded to one another, but retain their substantially discrete appearance of individual particles, with the inter-particle voids or interstices 49 remaining due to the substantially spherical yet deformed particle shapes.

Figure 6:
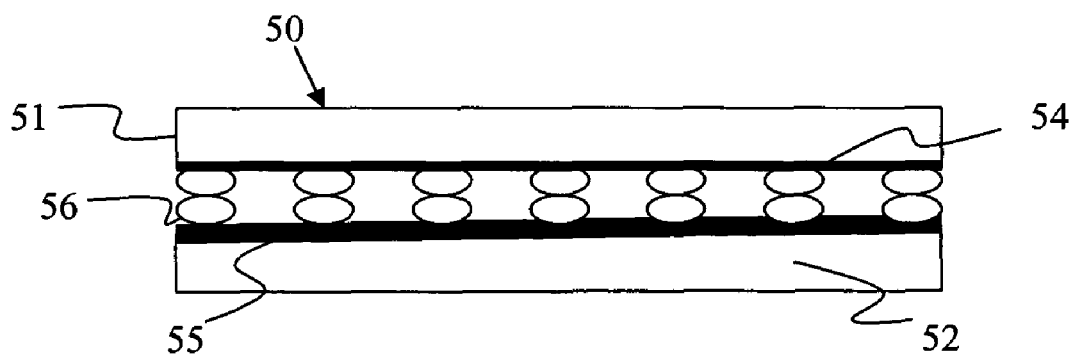
Figure 7:
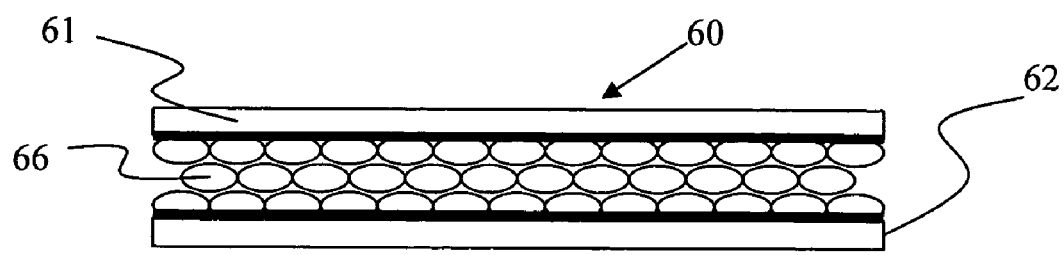
Figure 8:
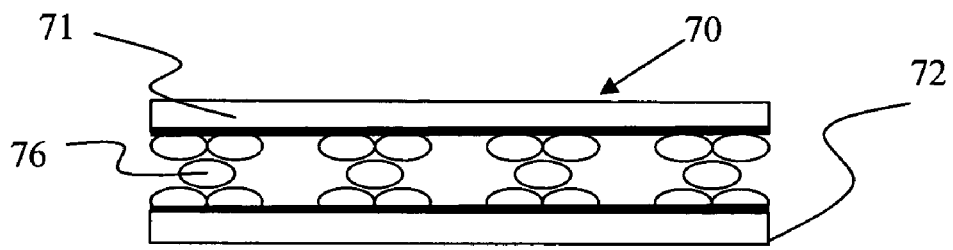

FIGS. 6 through 8 depict embodiments containing multiple tiers or layers of core particles. In the fifth embodiment illustrated in FIG. 6, lower and upper tiers of particles are stacked directly upon one another in an identical pattern to establish core 56. Adhesive layers 54, 55 bond the multi-tier core 56 to laminas 51, 52. In FIG. 7, the particles of core 66 are staggered relative to one another from tier to tier, establishing a continuous core 66 extending along the entire length of laminas 61, 62. The embodiment illustrated in FIG. 8 includes three tiers of particles staggered relative to one another. The particles are grouped into sets spaced apart from one another to provide a non-continuous pattern of particle sets. As discussed in further detail below, heat treatment stages during processing may cause the core particles of the fifth to seventh embodiments to soften and partially melt, resulting in surface bonding or fusion between adjacent particles. It is preferred, however, that the particles retain their substantially discrete characteristics throughout processing to retain the inter-particle interstices.

Figure 9:
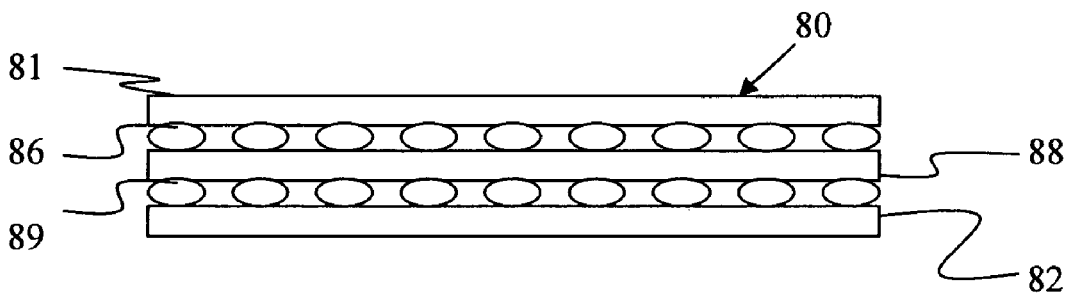

FIG. 9 illustrates a composite laminate 80 having a plurality of distinct cores 86, 89. Composite laminate 80 features outer laminas 81 and 82, and an intermediate lamina 88 positioned between cores 86, 89. It should be understood that the composite laminate may include three or more cores, and that the cores may be made of different materials or have different arrangements of particles or tier structures from one another.

Also provided herein are novel processes for making structural composite laminates. It should be understood that while the processes described herein are exemplary, other processes not expressly described herein may be used to make the structural composite laminates. For example, while the following description focuses on continuous manufacturing processes, it should be understood that batch processing may be employed.

Figure 10:
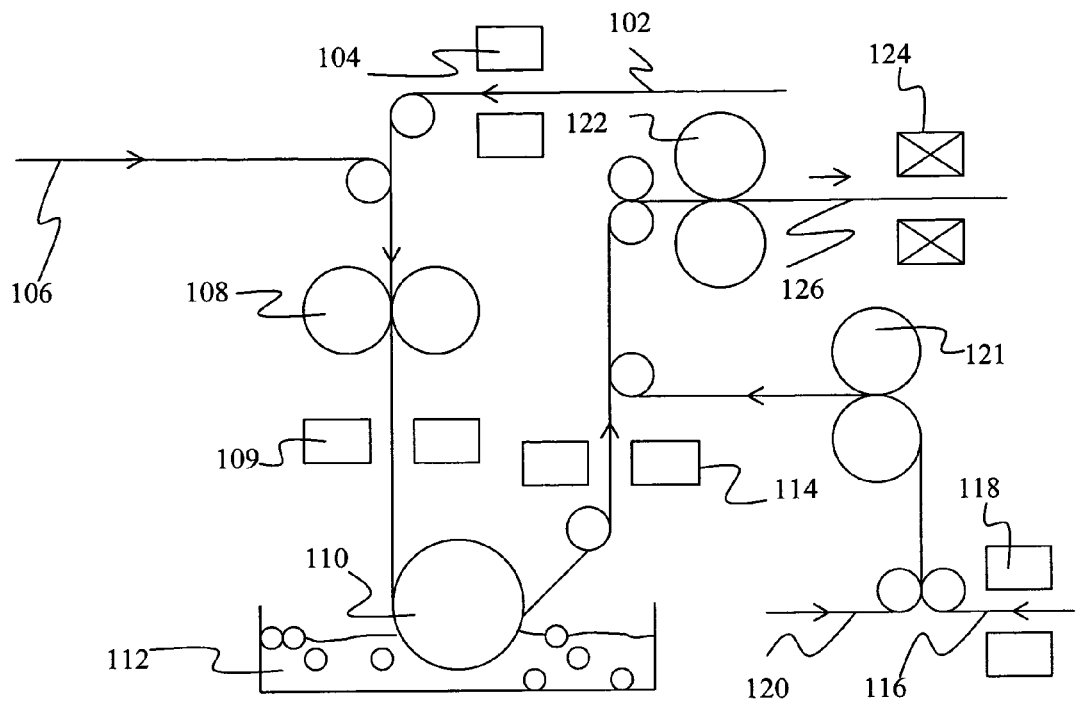
FIG. 10 is a schematic of a manufacturing process for making a structural composite laminate according to an embodiment of the invention.

Turning now to FIG. 10, an embodiment of a continuous process for making an inventive structural composite laminate is illustrated. A first lamina or skin 102 is pre-heated at heating stage 104 then joined with a second adhesive strip 106 in a continuous manner, such as by using hot air convection. Skin 102 and adhesive strip 106 pass through nip or compression rollers 108 to secure the adherence of strip 106 to skin 102. Adhesive strip 106 may contain, for example, either a continuous coating of adhesive or a pre-selected adhesive pattern corresponding to the desired pattern in which the core particles are to be arranged on skin 102. Skin 102 with applied strip 106 are heated at stage 109 to activate adhesive 106 prior to introduction into pellet bed 112. Roller 110 guides skin 102 and adhesive 106 through pellet bed 112 so that solid discrete particles contained in bed 112 are captured by and retained on adhesive 106. First skin 102 and adhesive 106 with captured particles are then directed to heating stage 114.

Simultaneously, a second lamina or skin 116 is preheated at heating stage 118 and joined to a second adhesive strip 120. After subjecting skin 116 and adhesive 120 to a compression stage between rollers 121, skin 116 with adhesive 120 are joined with first skin 102 carrying adhesive 106 with the captured particles. Compression rollers 122 apply a compressive force optionally at elevated temperature to establish a structural composite laminate 126. Preferably, the temperature of laminate 126 during compression step 122 is sufficiently high to soften or gel the solid polymeric particles so that the particles are permanently deformed during compression at stage 122. On the other hand, the temperature of laminate 126 at compression step 122, and throughout the process for that matter, preferably is not so high as to cause the core particles to be liquefied, melt, or otherwise destroy the substantial discreteness of the core particles. Deformation of the core particles during compression step 122 is desired for substantially negating any discrepancies between the particle thicknesses. Specifically, the thicker core particles are flattened and spread laterally outward during compression 122. Hence, compression 122 imparts a consistent and uniform thickness to the particles, thereby providing a uniform core thickness between skins 106, 116.

Structural composite laminate 126 is allowed to cool at cooling stage 124 for expediting removal of heat from laminate 126. Expeditious heat removal stabilizes the setting of structural composite laminate 126 by reducing the likelihood of unintended defects or deformities, such as caused by relative sliding movement between skins 102, 116. Cooling stage 124 may comprise, for example, forced air, a water cooling tower, or other appropriate system or technique.

Figure 11:
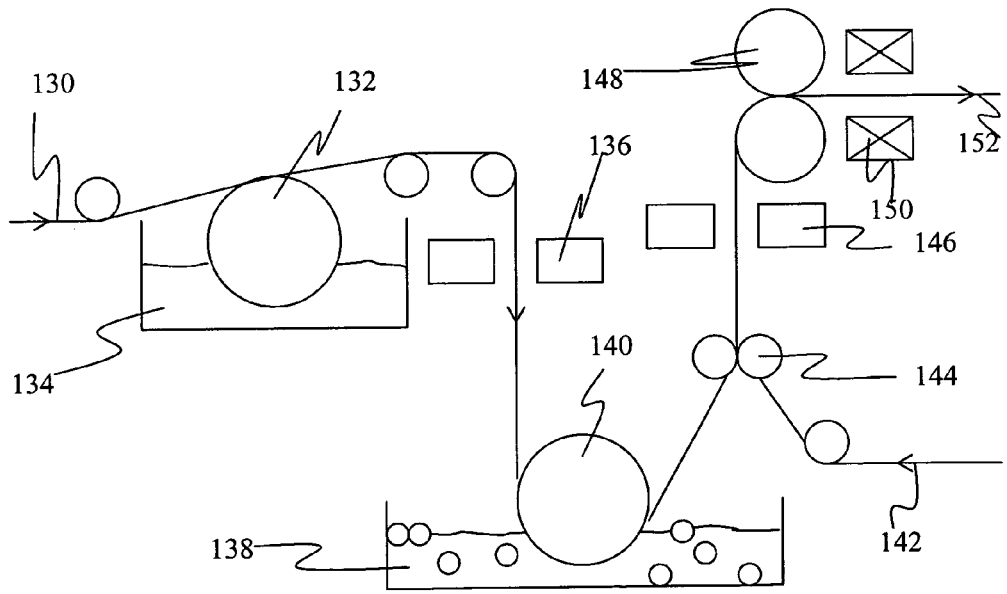
FIG. 11 is a schematic of a manufacturing process for making a structural composite laminate according to another embodiment of the invention.

FIG. 11 illustrates another embodiment of a continuous process for making an inventive composite laminate. In the interest of brevity, the following discussion will focus on differences between the processes of FIGS. 10 and 11. A first lamina or skin 130 is brought into contact with print roller 132 partially immersed in adhesive bath 134. A preferred adhesive for adhesive bath is molten ethylene vinyl acetate (EVA). The outer surface of print roller 132 may be embossed with a pre-selected pattern of protrusions that make direct contact with and transfer a corresponding pattern of adhesive to the inner surface of first skin 130. Skin 130 is then heated at stage 136 to activate the adhesive, and guided by roller 140 through pellet bath 138. Particles in the pellet bath adhere to first lamina 130 in a pattern corresponding to that of the printed adhesive on first lamina 130. The patterned particles remain captured on skin 130 as it leaves pellet bath 138.

A second lamina or skin 142 having an adhesive pre-applied to a lower surface thereof is introduced continuously into the process. Second skin 142 and first skin 130 with captured particles are joined together and subjected to heat treatment stage 146. The heat experienced at heat treatment stage 146 is preferably sufficient to soften or gel the discrete solid particles for deformation, yet preferably does not completely melt the solid particles. At a final compression stage 148, nip rollers apply sufficient pressure to deform the particles permanently between skins 130, 142 and promote bonding. Structural composite laminate 152 is allowed to cool, preferably at a cooling stage 150 similar to stage 124 described above.

Various modifications to the embodied methods described above may be made. For example, the polymeric particles may be subjected to permanent deformation before the second lamina is applied, such as by impacting a chill roller against the particles deposited on the first lamina. Another example of a suitable modification is to relocate the heat treatment stages throughout the processes. Additional or fewer heat treatment stages than those depicted may be employed. In this regard, it is possible to omit final heat treatment stages 114 and 146 of FIGS. 10 and 11, respectively. As another example of a potential modification to the processes, the adhesive agent may be placed directly into pellet bath 112, 138, thereby negating the use of adhesive strip 106 of FIG. 10 and adhesive bath 134 of FIG. 11. According to another embodiment, the pellets may incorporate an adhesive component, such as in the case of copolymer pellets derived in part from acrylic acid or methacrylic acid. According to still another embodiment, the adhesive may be sprayed onto lamina 139.

Figure 12:
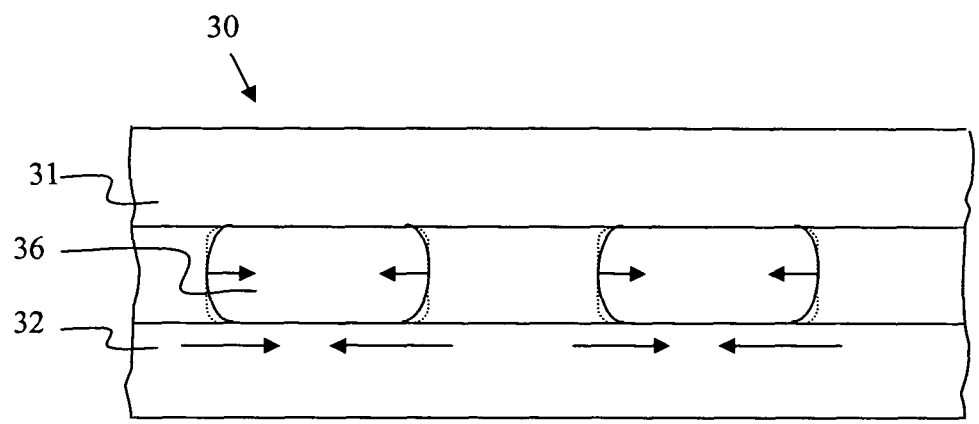
FIG. 12 is a side view of the composite laminate of FIG. 4, depicting compressive internal forces experienced in the structural composite laminate during rapid cooling.
Figure 13:
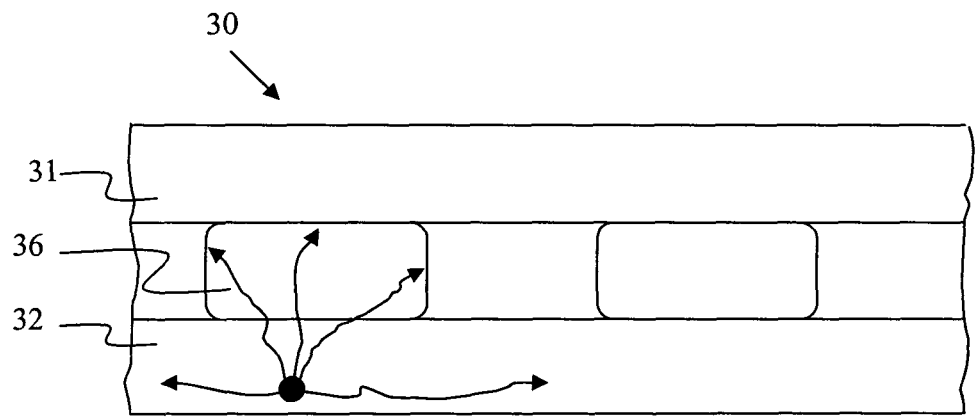
FIG. 13 is a side view of the composite laminate of FIG. 4, depicting attenuation of vibratory energy by the structural composite laminate.

The structural composite laminates described above include many improvements and provide various advantages. For example, due to the presence of inter-particle voids or interstices in the composite laminates, the composite laminates are light in weight. Additional advantages of embodiments of the present invention will now be described with reference to FIGS. 12-14.

Figure 16:
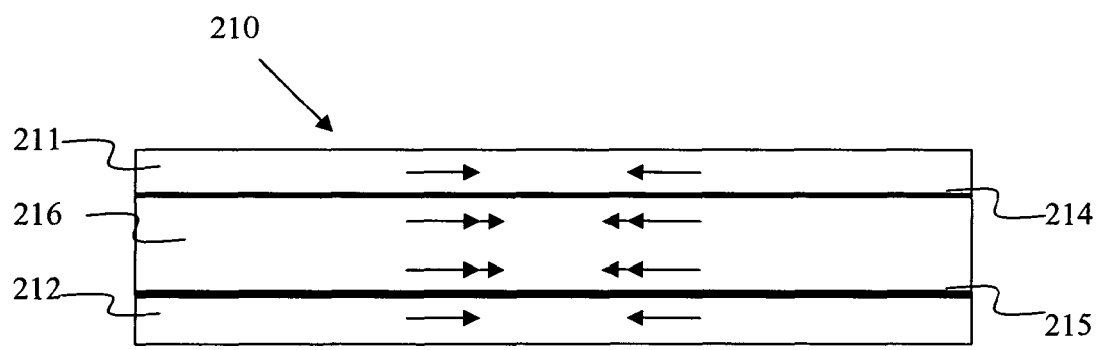
FIG. 16 is a side view of the composite laminate of FIG. 15, depicting compressive internal forces experienced in the laminate during rapid cooling.
Figure 17:
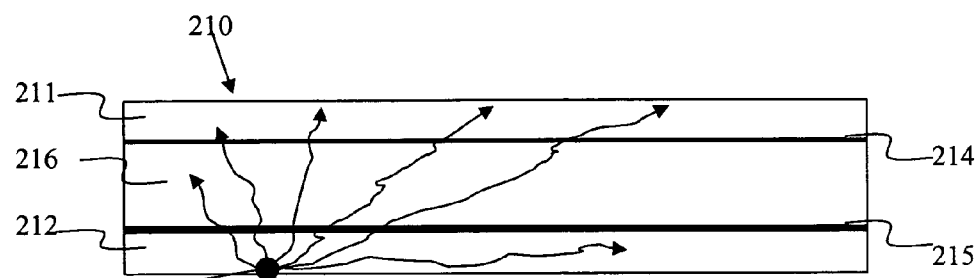
FIG. 17 is a side view of the composite laminate of FIG. 15, depicting attenuation of vibratory energy by the laminate.
Figure 18:
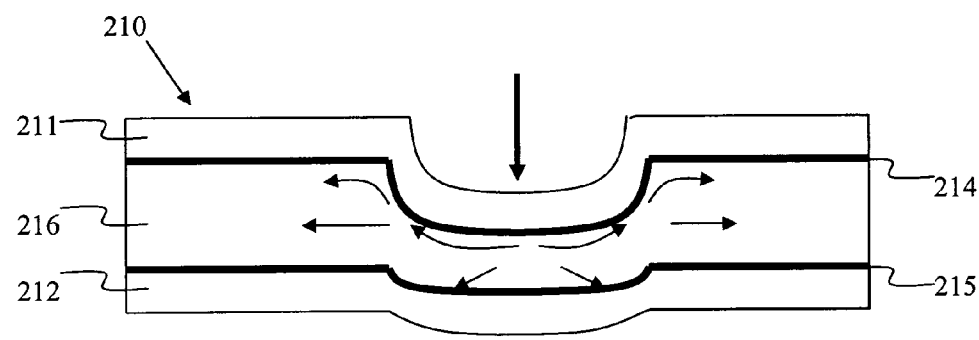
FIG. 18 is a side view of the composite laminate of FIG. 15, depicting the laminate subject to a crushing impact force.

The structural composite laminates of preferred embodiments of the invention may carry reduced latent intrinsic stresses. As explained above in reference to FIG. 16, outer laminas or skins made of metal have a coefficient of thermal expansion that differs from that of the non-metallic honeycomb or foam core. During a cooling stage of manufacture, the metal skins are believed to undergo a differing amount of contraction than core. When the core is in continuous contact with a large surface area of the metal skin, shear forces are experienced at the skin-core interfaces, as depicted in FIG. 16. The setting of adhesive layers simultaneously with the application of a shear force at the core-skin interface builds a latent shear stress into laminate along the adhesion layers. The incorporated stress may not be observed or revealed until long after manufacturing, such as when laminate is in use in the field.

Figure 14:
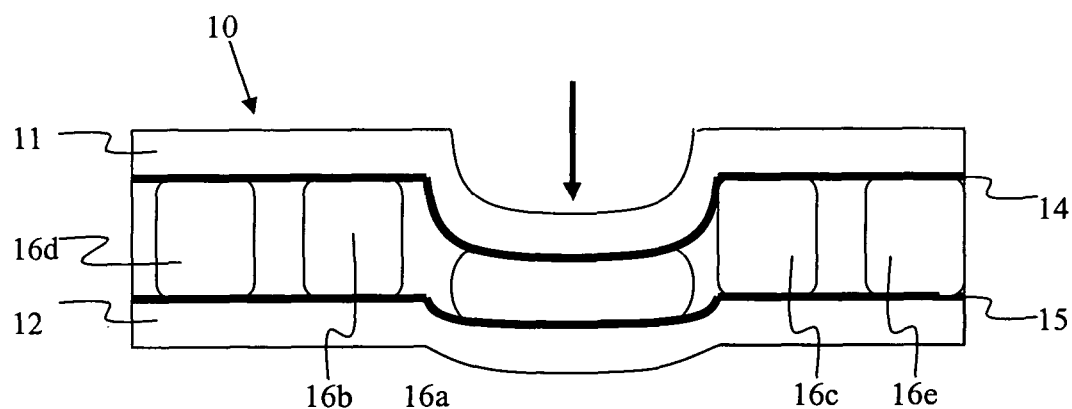
FIG. 14 is a side view of the composite laminate of FIG. 1, depicting the structural composite laminate subject to a crushing impact force.
Figure 15:
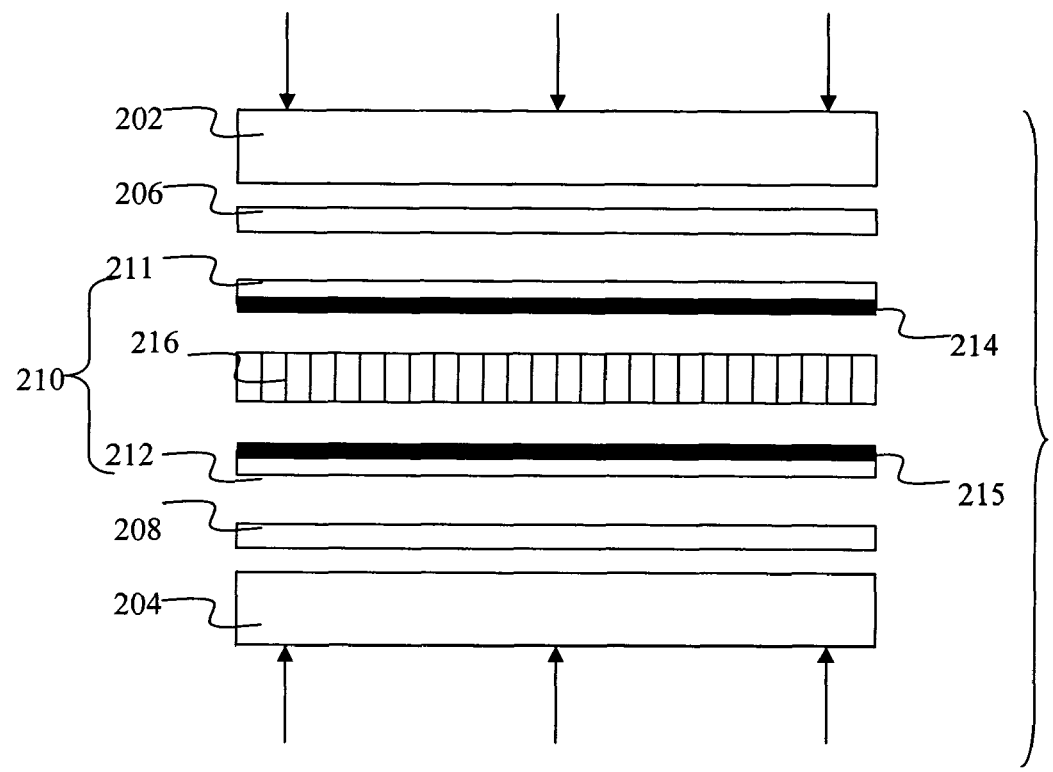
FIG. 15 is a side view of a conventional lamination press process for making a composite laminate.

The interstices or inter-particle gaps of the core structures of above embodied laminates of the present invention reduce the contact interface between the core and the outer skins and space the interfacing areas apart from one another. It is believed that these structural distinctions at the core-skin interface provide the skin and polymeric particles with greater freedom to expand and contract during heating and cooling operations of the manufacturing process without building significant shear stresses into the structural composite laminate. It is further believed that the non-continuous structure of the cores of certain embodiments of the invention provide even further relief from the latent shear stresses. As a consequence, the core is less likely to delaminate from one or both of the skins during use in the field. For example, in FIG. 13 core 36 will not carry a large vibratory force impacting skin 32 far along the length of laminate 30. Rather, the gaps between non-continuous core particles 36 will interrupt the transfer of energy from one core particle to another. Similarly, as shown in FIG. 14 an impact force at skin 11 deforms core particle 16a in proximity to the impact site, but has less or no effect on core particles 16b to 16e farther away from the impact area. As a consequence, the area over which skins 11, 12 will delaminate from core 16 is restricted to the area encompassing the particles at or in close proximity to the impact area.

The applications for which sandwich composites may be used are wide and varied. The sandwich composites may serve as a structural support and/or aesthetic appearances. The sandwich composites of the invention may be applied in various industries, including architectural, construction (e.g., facades on buildings), transportation (e.g., truck/trailer side panels), and many other uses.

The foregoing detailed description of the certain preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A process for making a structural composite laminate, comprising:
   providing a first lamina;
   depositing a plurality of solid yet deformable discrete, non-porous, thermoplastic polymeric particles having surfaces on the first lamina to establish a core, wherein inter-particle voids extend surface to surface from and to the respective surfaces of adjacent thermoplastic polymeric particles;
   applying a second lamina over the core;
   applying a sufficient compressive force to the first and second laminas to permanently deform the thermoplastic polymeric particles into a deformed state between the first and second laminas while retaining the inter-particle voids and maintaining the thermoplastic polymeric particles as non-porous; and releasing the compressive force without delaminating the first and second laminas from the thermoplastic polymeric particles to thereby provide a structural composite laminate comprising the first lamina, the second lamina, and a core between the first and second laminas the core comprising the non-porous thermoplastic polymeric particles substantially retained in the deformed state and having the inter-particle voids.

2. The process of claim 1, wherein said applying a sufficient compressive force comprises moving the first and second laminas towards one another at an effective temperature to permanently deform the thermoplastic polymeric particles into the deformed state.

3. The process of claim 1, wherein the first and second laminas comprise metals.

4. The process of claim 1, wherein the core possesses a monolayer of the thermoplastic polymeric particles.

5. The process of claim 1, wherein the core possesses a plurality of layers of the thermoplastic polymeric particles stacked one on top of another.

6. The process of claim 1, further comprising:
applying a first adhesive to join the first lamina to the core; and
applying a second adhesive to join the second lamina to the core.

7. The process of claim 1, wherein the thermoplastic polymeric particles comprise copolymers thermally bonding the first and second outer layers to one another free of a separate adhesive layer.

8. The process of claim 1, wherein the thermoplastic polymeric particles are arranged discontinuously from one another along at least one dimension of the laminate.

9. The process of claim 1, wherein the thermoplastic polymeric particles have a compression set greater than 30 percent as measured by ASTM D395 at 50° C. for 24 hours.

10. A process for making a structural composite laminate, comprising:
providing a first lamina;
depositing a plurality of solid yet deformable discrete, non-porous, substantially inelastic polymeric particles having surfaces on the first lamina to establish a core, wherein inter-particle voids extend surface to surface from and to the respective surfaces of adjacent substantially inelastic polymeric particles;
applying a second lamina over the core;
applying a sufficient compressive force to the first and second laminas to permanently deform the substantially inelastic polymeric particles into a deformed state between the first and second laminas while retaining the inter-particle voids and maintaining the polymeric particles as non-porous; and
releasing the compressive force without delaminating the first and second laminas from the substantially inelastic polymeric particles to thereby provide a structural composite laminate comprising the first lamina, the second lamina, and a core between the first and second laminas, the core comprising the non-porous, substantially inelastic polymeric particles substantially retained in the deformed state and having the inter-particle voids.

11. The process of claim 10, wherein said applying a sufficient compressive force comprises moving the first and second laminas towards one another at an effective temperature to permanently deform the substantially inelastic polymeric particles into the deformed state.

12. The process of claim 10, wherein the substantially inelastic polymeric particles have a compression set greater than 30 percent as measured by ASTM D395 at 50° C. for 24 hours.

13. The process of claim 10, wherein the first and second laminas comprise metals.

14. The process of claim 10, wherein the core possesses a monolayer of the substantially inelastic polymeric particles.

15. The process of claim 10, wherein the core possesses a plurality of layers of the substantially inelastic polymeric particles stacked one on top of another.

16. The process of claim 10, further comprising:
applying a first adhesive to join the first lamina to the core; and
applying a second adhesive to join the second lamina to the core.

17. The process of claim 10, wherein the substantially inelastic polymeric particles comprise copolymers thermally bonding the first and second outer layers to one another free of a separate adhesive layer.

18. The process of claim 10, wherein the substantially inelastic polymeric particles are arranged discontinuously from one another along at least one dimension of the laminate.

19. A process for making a structural composite laminate, comprising:
applying a compression force to a plurality of solid yet deformable discrete, non-porous, substantially inelastic polymeric particles situated between first and second lamina to deform the polymeric particles into a deformed state, and releasing the compression force without delaminating the first and second lamina from the substantial inelastic polymeric particles to form a structural composite laminate, the structural composite laminate comprising the first and second lamina bonded to the non-porous, substantially inelastic polymeric particles substantially retained in the deformed state with inter-particle voids extending surface to surface from and to respective surfaces of adjacent particles of the non-porous, substantially inelastic polymeric particles.

20. The process of claim 19, further comprising heating the substantially inelastic polymeric particles to at least partially melt the particles.

21. The process of claim 19, further comprising heating the substantially inelastic polymeric particles to fuse the particles to one another.

22. The process of claim 19, wherein the substantially inelastic polymeric particles are arranged discontinuously with respect to one another.

23. The process of claim 19, wherein the substantially inelastic polymeric particles are arranged in continuous contact with one another.

24. The process of claim 19, wherein said applying the compressive force comprises moving the first and second laminas towards one another to deform the polymeric particles.

25. The process of claim 24, further comprising heating the first and second lamina to heat the polymeric particles.

* * * * *